No. 770,936. PATENTED SEPT. 27, 1904.
W. S. SIMPSON.
MOTOR VEHICLE.
APPLICATION FILED DEC. 7, 1903.
NO MODEL. 5 SHEETS—SHEET 2.
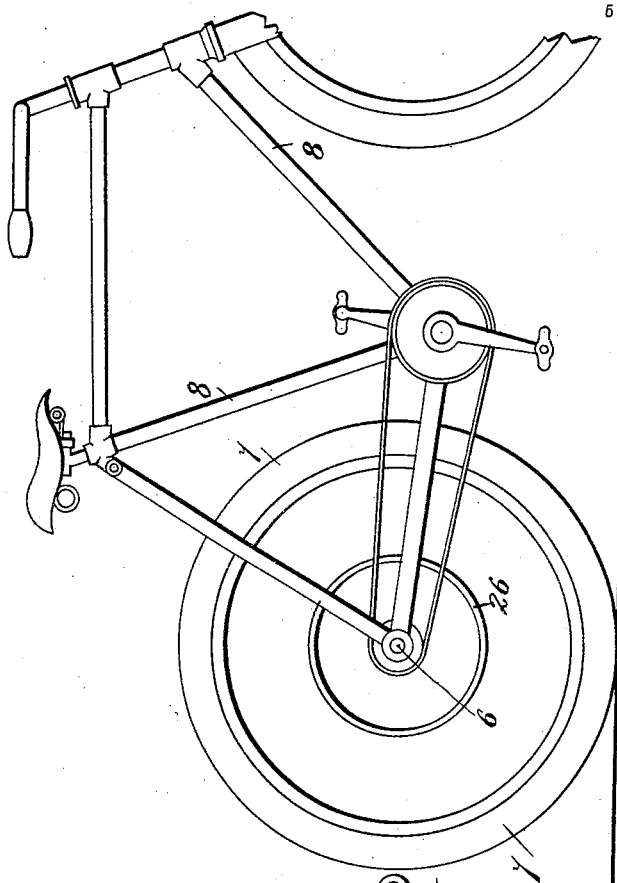
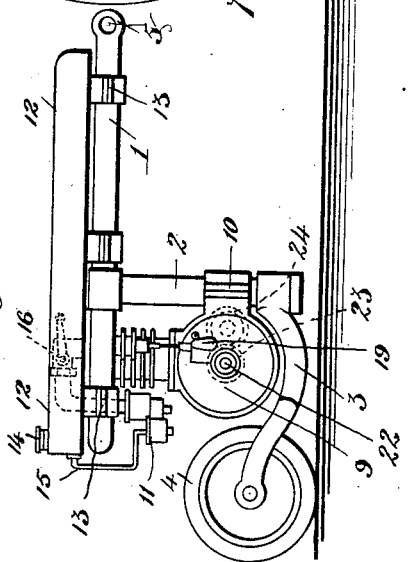
Witnesses.
Inventor.
William S. Simpson.

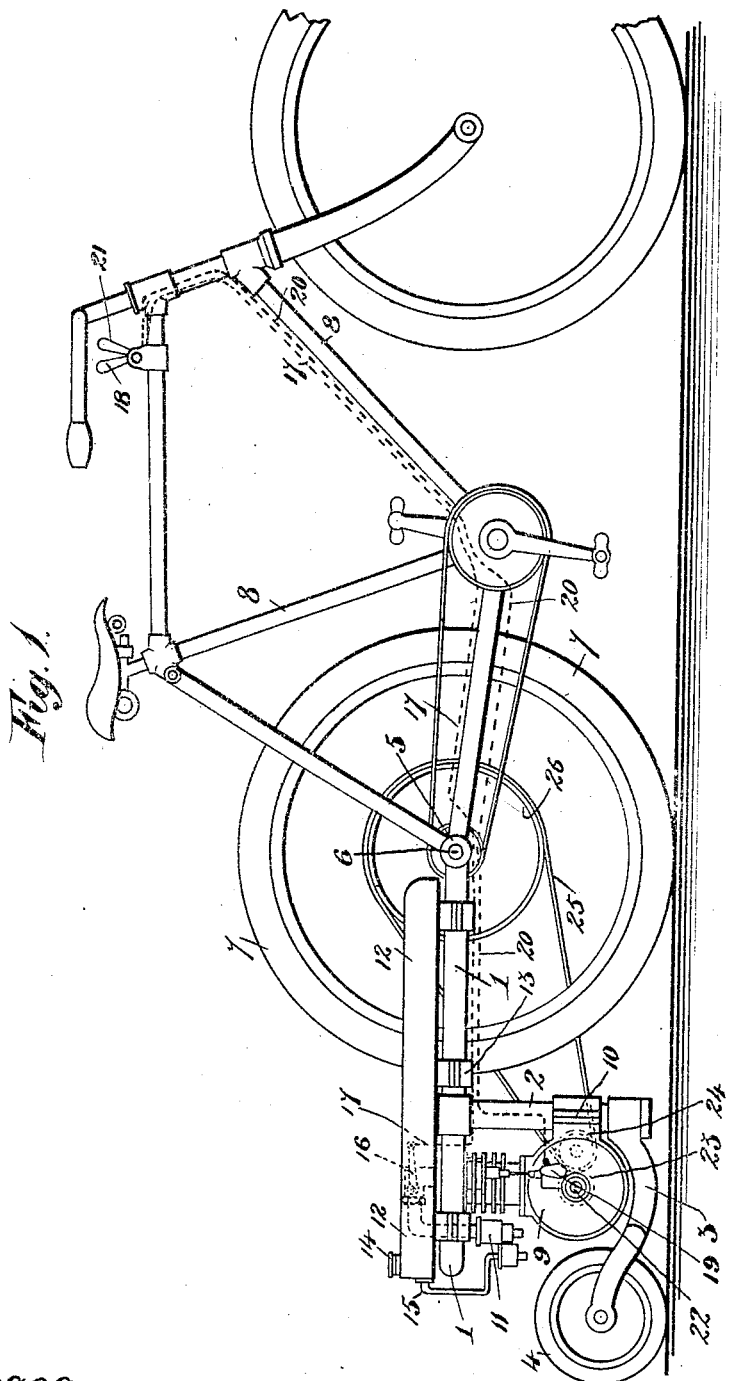

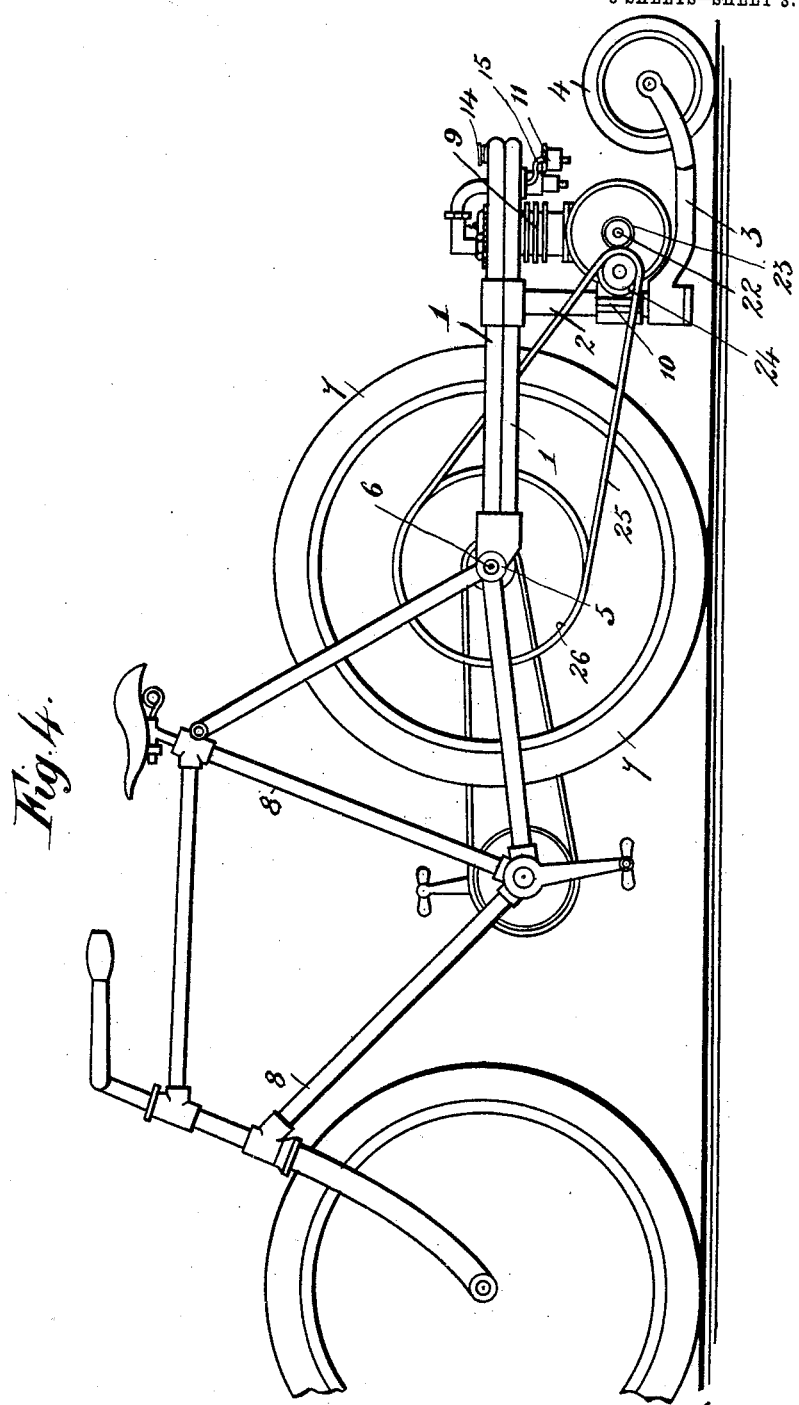

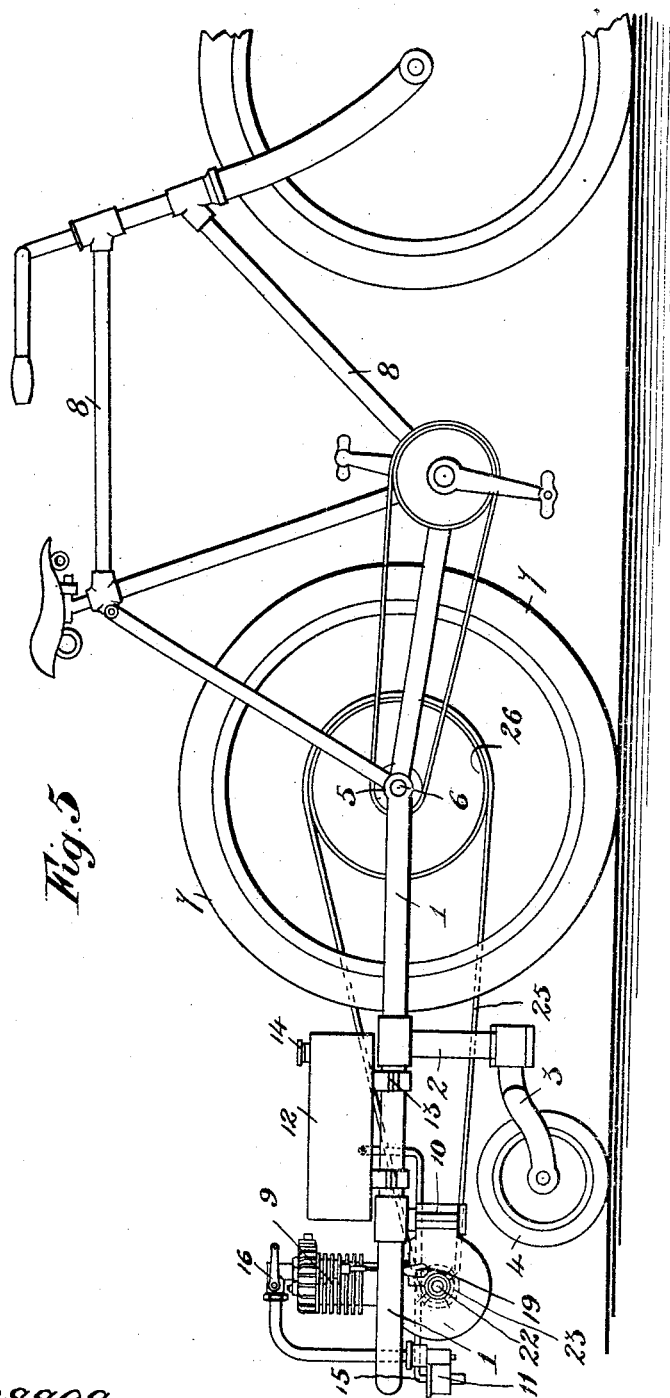

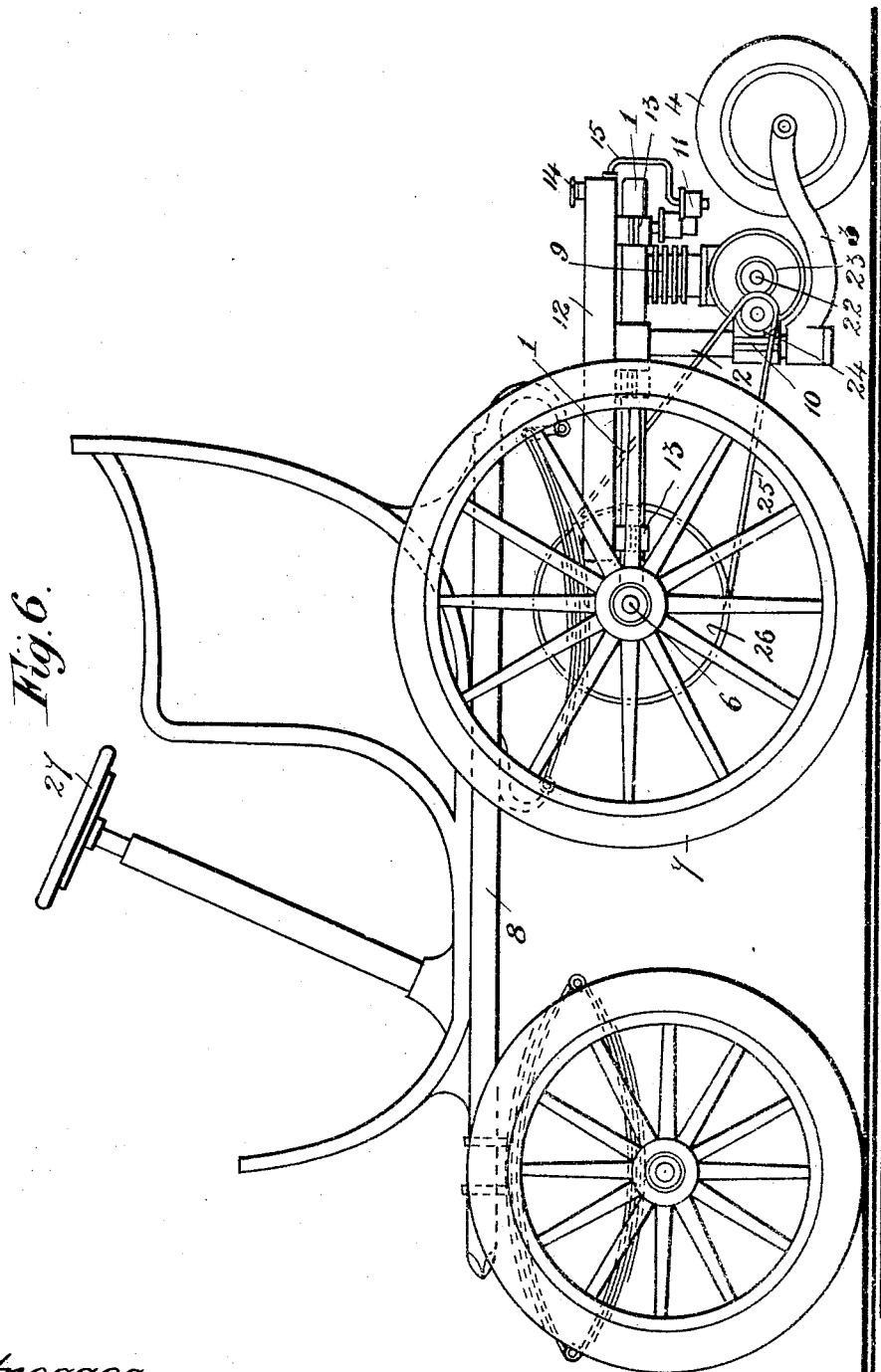

No. 770,936. Patented September 27, 1904.

UNITED STATES PATENT OFFICE.

WILLIAM SPEIRS SIMPSON, OF LONDON, ENGLAND.

MOTOR-VEHICLE.

SPECIFICATION forming part of Letters Patent No. 770,936, dated September 27, 1904.

Application filed December 7, 1903. Serial No. 184,202. (No model.)

*To all whom it may concern:*

Be it known that I, WILLIAM SPEIRS SIMPSON, a subject of the King of Great Britain, residing at 49 Battersea Park road, London, England, have invented certain new and useful Improvements in Apparatus for Propelling Bicycles and other Vehicles, of which the following is a specification.

The object of my invention is the construction of an auxiliary detachable propelling apparatus for bicycles and other vehicles which can be readily connected to and disconnected from a bicycle or vehicle when desired, the auxiliary driving apparatus being so arranged as to be completely equipped with appurtenances for attachment to a bicycle or vehicle and driving the same.

The annexed drawings show several examples of carrying my invention into effect.

Figure 1 is a side elevation of an ordinary bicycle with the auxiliary detachable propelling apparatus attached. Fig. 2 is a side elevation of the auxiliary detachable propelling apparatus. Fig. 3 is a side elevation of a portion of an ordinary bicycle. Fig. 4 is a side elevation of an ordinary bicycle with the auxiliary detachable propelling apparatus attached, the oil-tank being arranged differently to that shown in Fig. 1. Fig. 5 is a side elevation of a bicycle with the auxiliary detachable propelling apparatus attached, the engine being behind the trailing wheel. Fig. 6 is a side elevation of a four-wheeled vehicle with the auxiliary detachable propelling apparatus attached.

According to Figs. 1 and 2 the auxiliary detachable propelling apparatus is constructed from tubular framework 1, having a depending leg 2, said leg having gimbaled to it an arm 3, carrying a wheel 4. The front ends of the framework 1 are provided with eyes 5, by which such framework can be secured to the axle 6 of the rear wheel 7 of the bicycle 8 by nuts in an ordinary way and so that the framework may have a rocking movement up and down about the axle and not a side movement. The motor 9 is situate in the rear end of the framework 1 and is rigidly connected to the leg 2 by clamps 10, and the carbureter 11 is secured as usual, the petrol-tank 12 secured to the framework 1 by the clips 13 and provided at one end with a filling-nozzle 14 and a pipe 15 to connect the petrol-tank with the carbureter 11. The supply of oil-vapor to the engine 9 is controlled by the valve 16, and this is operated by flexible wire 17, running along the frame of the bicycle to near the handle-bar, where it is connected to a lever 18 for operation by the hand. The electric spark igniter 19 is also operated by a flexible wire 20, this also running along the frame of the bicycle to the same or the other handle, where it is provided with a lever 21 for operation by hand. The driving-axle 22 of the motor carries a sprocket 23, and this is in gear with a pinion 24, which is connected by band or chain 25 to a wheel 26 on the hub of the rear wheel 7 to drive same, and this propels the machine, which is provided with an ordinary free wheel, as usual. The wheel 4 runs on the ground and supports, with the axle 6, the auxiliary propelling apparatus, the wheel 4 being pivoted to the post 2, so that the wheel can have a movement sidewise to suit the inequalities of the road and facilitate steering, and such arm 3 can be spring-cushioned to take up jars or jumps, thus lessening the vibration on the apparatus.

In Fig. 4 the petrol-tank is the frame 1, and in Fig. 5 the petrol-tank 12 is secured to the frame and lies parallel with it, as in Figs. 1 and 2, and the engine 9 is placed behind the wheel 4, so that the wheel 4 practically balances the engine with the cycle and takes the weight of the engine off the cycle.

Fig. 6 shows the application of the auxiliary propelling apparatus shown in Fig. 1 affixed to and driving the rear axle of a four-wheeled vehicle, the motor and its appurtenances being controlled by the driver from the car, the steering being effected by the handle 27.

By this invention all the vibratory motions of the motor-engine and the concussions on the wheel 4 due to inequalities of the road will not be communicated to the bicycle or vehicle, thus making the riding more pleasant than when the motor is part of the vehicle.

What I claim, and desire to secure by Letters Patent, is—

1. In a bicycle or other vehicles, the combination with a rear axle having a traction-wheel, a frame having a supply-tank, flexibly connected to the said axle, a driving-motor carried by the frame, means for supporting the frame, and means connecting the motor with the traction-wheel.

2. In a bicycle or other vehicles, the combination with a rear axle having a traction-wheel, a frame flexibly connected to said axle, a motor on said frame, means for supporting the frame, means connecting the motor to the traction-wheel, and means for controlling the motor.

3. In a bicycle or other vehicles, the combination with the rear axle, a frame flexibly connected thereto having a supply-tank, wheels connected to the frame, a driving-motor carried on the frame, a supply-tank in communication with the motor, means connecting the motor with the axle, and means for controlling the motor.

4. In a bicycle or other vehicles having a rear axle, the combination of a frame flexibly connected thereto, a driving mechanism carried by said frame, means for directly connecting the driving mechanism with the rear axle, and means for controlling the said mechanism.

5. In a bicycle or other vehicles, the combination with a rear axle, a frame yieldably connected thereto, a motor supported by the frame having connections with the axle for driving the same, arms connected to the frame and pending therefrom, said arms carrying wheels serving as a support for the frame, and hand-operable means for controlling the motor.

In testimony whereof I have hereunto set my hand in presence of two subscribing witnesses.

WILLIAM SPEIRS SIMPSON.

Witnesses:
RICHARD CORE GARDNER,
LYNWOOD FERDINAND GARDNER.